United States Patent [19]

Orbach

[11] 3,955,052
[45] May 4, 1976

[54] SUBSCRIBER UNIT PARTICULARLY USEFUL FOR TIME-DIVISION-MULTIPLEX SYSTEM

[75] Inventor: Shelomo Orbach, Haifa, Israel

[73] Assignee: Tadiran Israel Electronics Industries Ltd., Tel Aviv, Israel

[22] Filed: Nov. 18, 1974

[21] Appl. No.: 517,532

[52] U.S. Cl. ............................................. 179/18 FA
[51] Int. Cl.² ........................................... H04Q 1/28
[58] Field of Search ................. 179/18 FA, 77, 16 F

[56] References Cited
UNITED STATES PATENTS
3,522,384    7/1970    Ricketts et al. ..................... 179/16 F FOREIGN PATENTS OR APPLICATIONS
1,233,445    2/1967    Germany ........................ 179/18 FA

*Primary Examiner*—William C. Cooper

[57] ABSTRACT

A line circuit for connecting telephone subscriber terminals to a signal transmission network which includes constant current sources for driving the subscriber terminals and an isolated line transformer for connecting the terminals to the transmission network. The constant current sources include a pair of transistors with a mutual feedback loop for regulating the current in the transistors. An amplifier can be included in the feedback loop to further regulate the transistor current.

7 Claims, 5 Drawing Figures

SUBSCRIBER UNIT PARTICULARLY USEFUL FOR TIME-DIVISION-MULTIPLEX SYSTEM

BACKGROUND OF THE INVENTION

The present invention relates to a subscriber unit for use in a telephone system. The subscriber unit of the invention is particularly useful with respect to the time-division-multiplex system described in copending Pat. application Ser. No. 517,533, filed Oct. 24, 1974, by the same applicant as the present application. The present invention is therefore described below particularly with respect to that application, but it will be appreciated that it, or certain of its features, could be advantageously used in other systems as well.

One of the most important components of electronic telephone exchanges is the line circuit interface unit which interfaces the electronic part of the exchange with the central-battery subscriber's set. The line circuit supplies the direct current needed for the subscriber's set for signalling and also for driving the subscriber's microphone. In addition, the line circuit provides the relatively high ringing voltage, and also protects against excess voltage surges. Further included in the line circuit are the off-hook and dialling detectors and the transfer detector.

The line circuit is usually connected to the exchange through a line transformer whose coil on the line side is split into two equal parts, the direct current voltage being connected through resistors, chokes, or a relay, between the taps of the two parts of the transformer coil. Such a circuit isolates the power supply, thereby enabling the connection to it of many line circuits. In addition, the circuit enables the detection of the subscriber's signalling.

In such a system, the line wires can be easily unbalanced by any unbalance of the transformer parts, relay coil, or resistors, resulting in increased cross-talk. Further, the transformer has to pass, without saturating, 30–100 mA direct current in accordance with the line's length. This requires a transformer of substantial size to prevent saturation, even though the power delivered by the transformer is only about 1 mW. Also, ballasts may be required to guard the microphone of the subscriber's set particularly on short lines.

An object of the present invention is to provide a line circuit which provides advantages in one or more of the above respects.

SUMMARY OF THE INVENTION

According to a broad aspect of the present invention, there is provided a line circuit for connecting a subscriber terminal to a signal transmission network. The line circuit includes a constant direct current supply for driving the subscriber terminal and a line transformer for connecting the subscriber teminal to the signal transmission network. The constant direct current supply has a large impedance and suplies a constant current of about 30 mA when the line resistance is less than 1400 ohms. A capacitor is utilized to block the passage of the constant direct current through the line transformer.

A number of important advantages are provided by the foregoing arrangment. First, small line transformers may be used since they pass only the alternating microphone currents and not the direct current for driving the microphone. In addition, the microphone alternating current outputs are independent of line length thereby eliminating the need for ballasts to guard the microphone of the subscriber's set on short lines. Further, the use of the constant current sources enables all the subscriber units to be connected to a common power supply with minimum cross-talk between them, the cross-talk being reduced by the large impedance of the constant current sources. In addition, it has been found that the microphone, when driven by a constant current source, produces a cleaner wave-form than produced in conventional circuits.

According to another feature of the invention, the constant direct current supply includes a pair of symmetrical, constant direct current sources and a feedback loop, each wire of the line being connected to one of the constant direct current sources.

In the preferred embodiment of the invention, the constant direct current sources comprise a pnp and an npn transistor connected together in series with DC voltage sources, the feedback loop comprising a first pair of resistors connected between and in series with the two transistors, and a second pair of resistors each connected at one side to the juncture of the two resistors of the first pair, and at the other side to the base of one of the transistors.

According to a further feature of the invention, the line circuit further includes an amplifier in the feedback loop for regulating and equalizing the current through the transistors.

According to a still further feature, the line circuit also includes a transfer order detector that is effective, when one of the wires is shorted to ground, to sense the unbalance of symmetry and to produce a transfer order signal.

According to another aspect of the invention, there is provided a subscriber's unit which includes a line circuit as descried above, and a subscriber's link for receiving the output of the line transformer, for connecting the output to the signal transmission network.

In the described embodiment, the subscriber link includes a hybrid circuit comprising an assymmetrical resistor bridge for producing a smaller loss in the signal transmitted to the transmission network than received from the transmission network.

As mentioned above, the invention is particularly useful in a time division multiplex system in which the signal transmission network is a common transmission highway, and in which the subscriber link includes an In-gate and an Out-gate for accessing the hybrid circuit to the common transmission highway according to specific time-slots.

BRIEF DESCRIPTION OF THE DRAWINGS

The invention is herein described, by way of example only, with reference to a preferred embodiment illustrated in the accompanying drawings, wherein.

Figure 1:
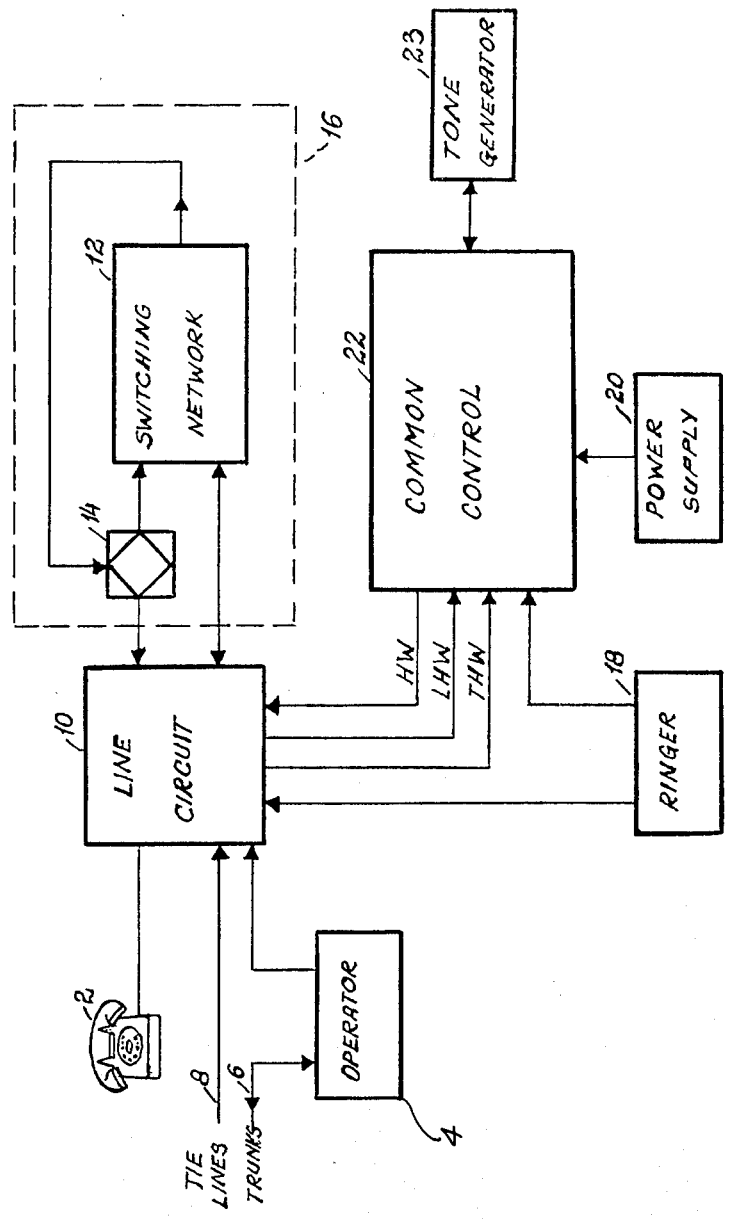
FIG. 1 is a block diagram of a time-division-multiplex system incorporating the present invention.

The system illustrated in the drawings is a private automatic branch-exchange (PABX) including a common-control unidirectional time-division-multiplex switching arrangement. It uses a single highway HW for transmitting all the analog information (speech and signalling tones) within the system. A single highway is used in this case because of the small number of terminals within the system. As an example, the system may include the possibility for connecting 24 central battery subscriber terminals 2 including the operator terminal 4, plus four trunk lines 6, and four tie lines 8 to similar private automatic branch exchanges.

The line circuit 10 connects the terminals 2 to a switching network 12 via a hybrid circuit 14 which effects a 2-wire to 4-wire tranformation. The hybrid circuit and the switching network in the standard subscriber's unit are commonly called a standard link, this link being indicated by the broken line box 16 in FIG. 1. Two 2-wire subscribers are tied by connecting a loop of hybrid circuits.

The line circuit 10 supplies the direct current needed in the subscriber's set for signalling and for driving the subscriber's microphone. In addition, it connects the set to the ringer 10 supplied by a relatively high voltage from power supply 20. The line circuit also contains the signalling detectors (off-hook and dialling) which detect the foregoing conditions and produce a signal which is fed to the common-control 22 via the LHW bus to control the tone generators 23. It further includes the transfer order detector which detects a transfer order (by the subscriber shorting one of the line wires to earth) which transfer order is also fed to the common-control 22 via bus THW.

The common-control 22 supplies all the timing information to the switching network 12, and also functionally supervises every terminal and every link of the telephone exchange.

The time-division-multiplex system of FIG. 1 is more particularly described in the above-reference co-pending Pat. application Ser. No. 517,533 filed Oct. 24, 1974, and therefore further details of the system not essential for an understanding of the present invention are not included in the present description.

The subscriber's unit, of which the present invention is primarily concerned, relates to the line circuit 10 and the standard link 16 portions of the FIG. 1 system. A standard subscriber's unit incorporating the present invention is more particularly illustrated in FIG. 2.

Figure 2:
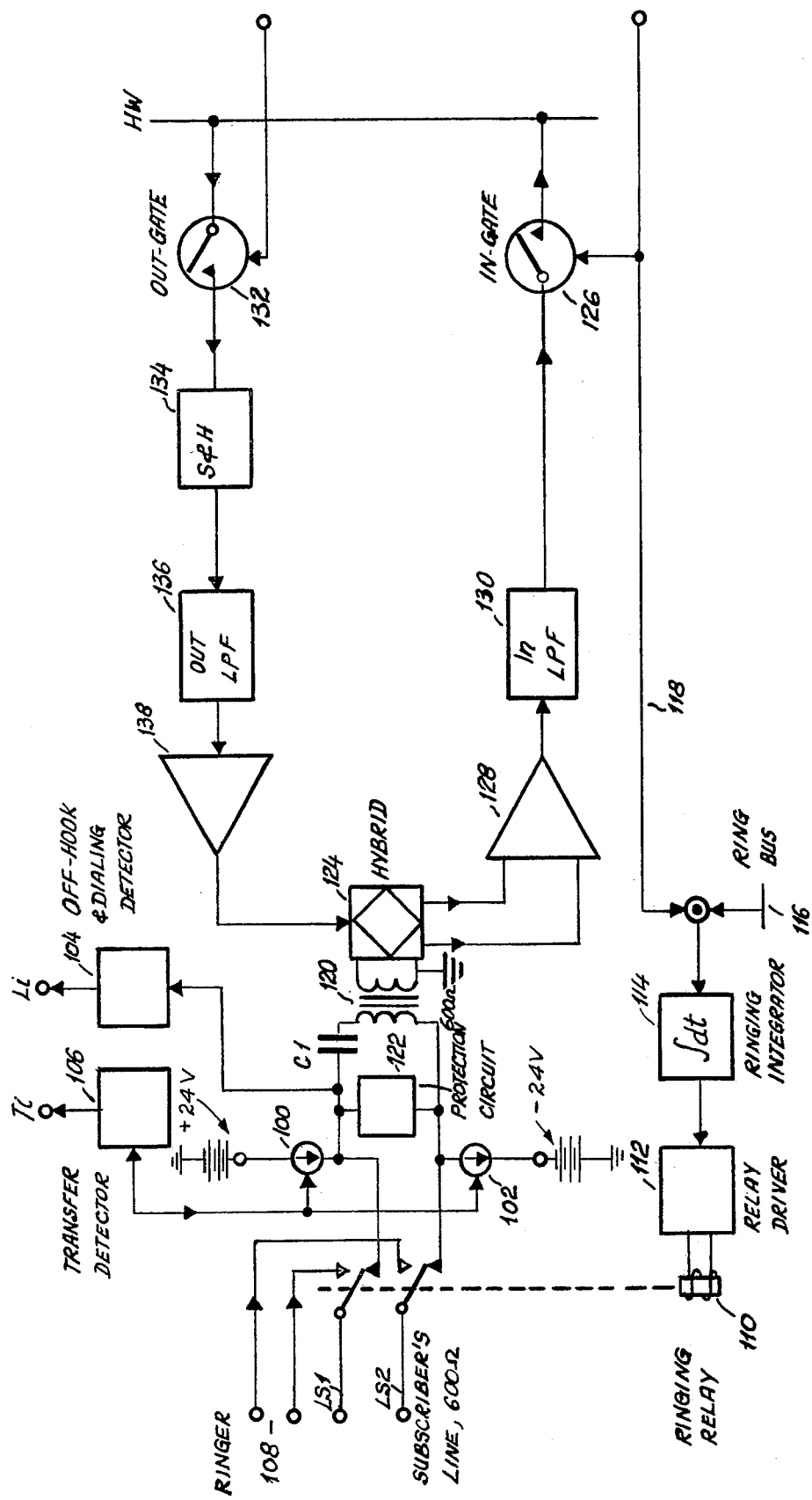
FIG. 2 is a block diagram illustrating the standard subscriber's unit of the system of FIG. 1.

As shown in FIG. 2, the line circuit (10 in FIG. 1) includes a direct current supply for the subscriber's set, the direct current supply comprising a pair of constant current sources 100, 102, to be described more particularly below.

The line circuit further includes a signalling detector 104 for producing off-hook and dialling signals (Li) which are fed to the commoncontrol 22 of the system via bus LHW (FIG. 1), and a transfer signalling detector 106 for producing transfer order signals (Ti) which are fed to the common-control via bus THW (FIG. 1). The line circuit further includes a ringer source 108 for applying the ringing voltage to the line, this source being controlled by a ringing relay 110 driven by a relay driver 112. Driver 112 is in turn controlled by a ringing integrator 114 receiving a voltage from ring bus 116 which is enabled by a signal on line 118, the latter signal being the same one aplied to the In-gates of the switching network (12, FIG. 1) of the respective line circuit.

The line circuit in FIG. 2 further includes a line transformer 120, and a surge-protection circuit 122, the latter circuit being known per se and therefore not further described herein.

The standard link (16. FIG. 1) 1) includes a hybrid circuit 124 (corresponding to 14 in FIG. 1) which is coupled to the line circuit by line transformer 120 and which transmits the audio information, as well as the signalling information, to and from the common transmission highway HW. The input side of the link includes In-gate 126 which couples the hybrid circuit 124 to the common transmission highway HW via an amplifier 128 and a low-pass-filter 130. The output side of the link includes an Out-gate 132 which couples the common transmission highway HW to hybrid circuit 124 via a sample-and-hold circuit 134, low-pass-filter 136, and amplifier 138.

The constant current sources 100, 102 are each connected to one of the wires LS1, LS2 of the subscriber's line. They supply the direct current needed for the subscriber's set without loading or unbalancing the line wires. They are of large impedance and supply a constant current of 30 mA, provided the line resistance is less than 1400 ohms; preferably, the subscriber's line resistance is 600 ohm. A capacitor C1 is provided in series with the line and the primary winding of line transformer 120.

The provision of constant current sources 100, 102 for driving the microphone of the subscriber set assures that the microphone alternating current output will be independent of the line length, and therefore there is no need for ballasts to guard the microphone of a subscriber's set having a short line. Also, since the constant current sources are of large impedance, this enables the connection of all the subscriber units to a common current supply without substantial cross-talk. Further, capacitor G1 blocks the passage of the direct current to the line transformer 120, and therefore the line transformer can be a small one, substantially smaller than heretofore required in the conventional system, without danger of saturating. In addition, it has also been found that the microphone, when driven by a constant current source, produces a cleaner waveform than in the conentional system.

Figure 3:
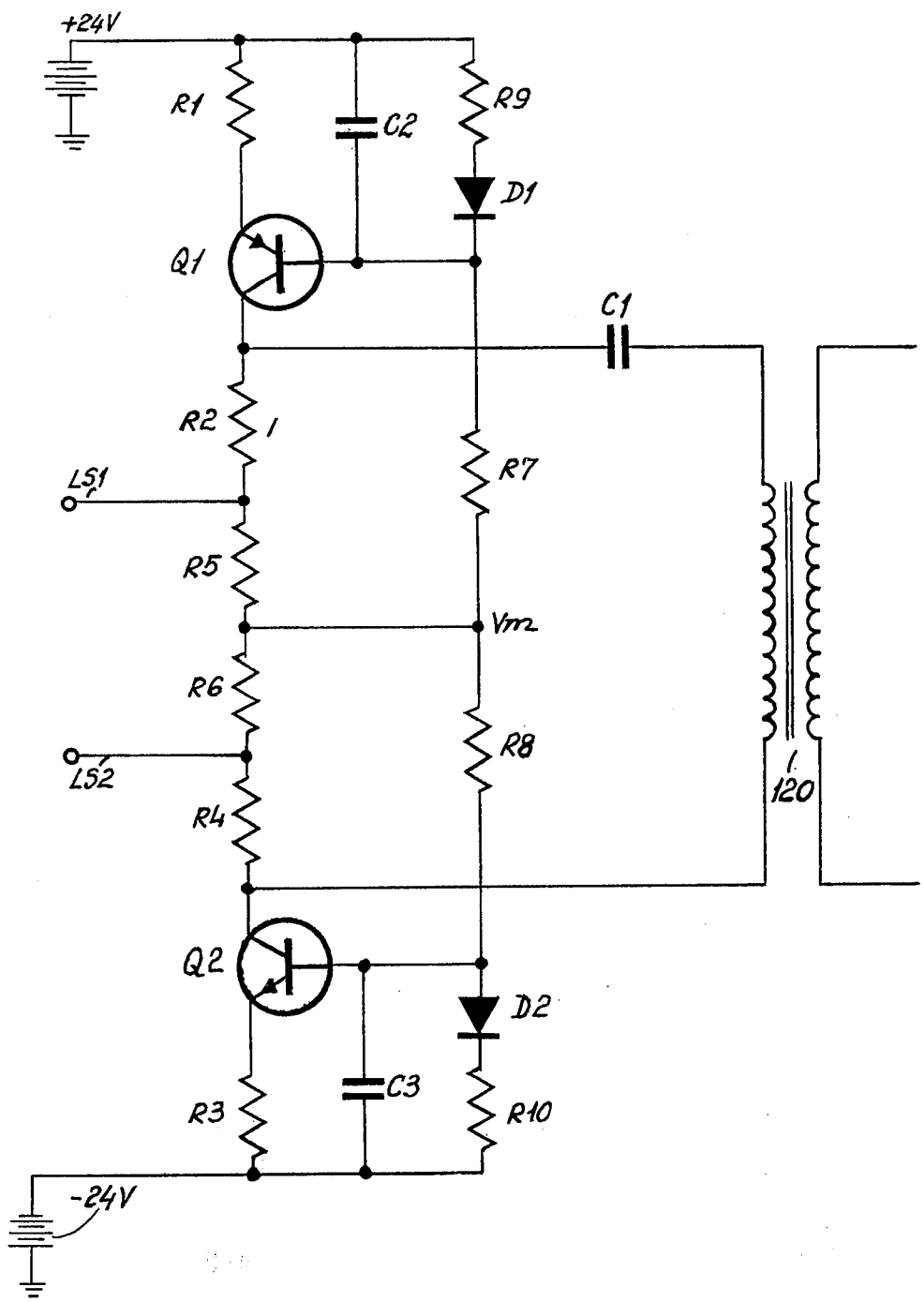
FIG. 3 is a circuit diagram illustrating one form of line circuit in accordance with the invention for use in the subscriber's unit of FIG. 1.

FIG. 3 illustrates one form of constant direct current supply which may be used for the constant current sources, 100, 102, of FIG. 2.

The constant direct current supply illustrated in FIG. 3 includes a pair of symmetrical constant direct current sources and a feedback loop. One constant current source includes a pnp transistor Q1 having its emitter connected via resistor Ri to a +24 V bus and its collector connected via resistor R2 to subscriber line wire LS1. The other constant current source includes a npn-transistor Q2 having its emitter connected via resistor R3 to a −24 V bus and its collector connected via resistor R4 to the other subscriber line wire LS2. A further pair of resistors R5, R6 are connected in series between the two transistors and across the subscriber line wires LS1, LS2.

Each transistor Q1, Q2 includes a feedback resistor R7, R8 connected at one side to the juncture of the two resistors R5, R6, and at the other side to the base of the respective transistor Q1, Q2. Further, a diode D1 is connected via a resistor R9 between the base of transistor Q1 and its emitter resistor R1; and a second diode D2 is connected via resistor R10 between the base of transistor Q2 and its emitter resistor R3. Further, a capacitor C2 is connected across the +24 V bus and the base of transistor Q1, and another capacitor C3 is connected across the −24 V bus and the base of transistor Q2.

One side of the primary winding of line transformer 120 is connected, via blocking capacitor C1, to the collector of transistor Q1, and the other side of the transformer winding is connected to the collector of transistor Q2.

It will be seen that the feedback loop, including resistors R7 and R8, regulates the current in the two transistors Q1, Q2 to provide a constant current output to the subscriber line wires LS1 and LS2. The diodes D1, D2 maintain constant current even with the temperature changes, since they are poled so that the voltage across them tracks the base emitter voltage, thereby maintaining a substantially constant voltage across the emitter resistor of the respective transistor, and a substantially constant emitter-collector current.

The capacitors C2, C3 in the system of FIG. 3 isolate the connection between the voltage sources and the line. A great number of identical circuits can therefore be connected to the same voltage sources. As a practical matter, each capacitor C2, C3 illustrated in FIG. 3 would preferably be composed of electrolytic and non-electrolytic capacitors in parallel.

Resistors R5 and R6 are needed for the feedback loop. Their value is high enough to load the line; as an example, each may be 47 Kohm. As noted above, the current sources themselves have high impedances. When the line is open (on-hook and dialling conditions), or when the line loop resistance ($R_L$) is greater than a definite value ($R_{Lo}$), the two transistors will saturate.

Resistors R2 and R4 do not influence the balance of the current and their value is much smaller than that of resistors R5 and R6; for example resistors R2 and R4 may each be about 100 ohms. They are needed to provide some resistance to the line in the open line conditions, which is an important requirement for the hybrid circuit 124.

The transfer order is effected by the subscriber shorting either of the line wires to ground. As a practical matter, the connection through ground (i.e. between the subscriber's connection to ground and the exchange's connection to ground) is usually not of zero resistance, the resistance being in the order of up to 100 ohms. Theoretically, the transfer order can be discriminated because of the unbalance of symmetry achieved by the short, which unbalance changes the voltage of the middle junction (Vm) of the feedback loop.

However, the circuit illustrated in FIG. 3 will not always give a good and reliable indication of the unbalance, especially for long lines. For example, there may be an unbalance voltage produced because of asymmetrical values of components of the two current sources, and it may not always be possible to reliably discriminate between that unbalance voltage and the unbalance caused by the transfer order short to earth.

Figure 4:
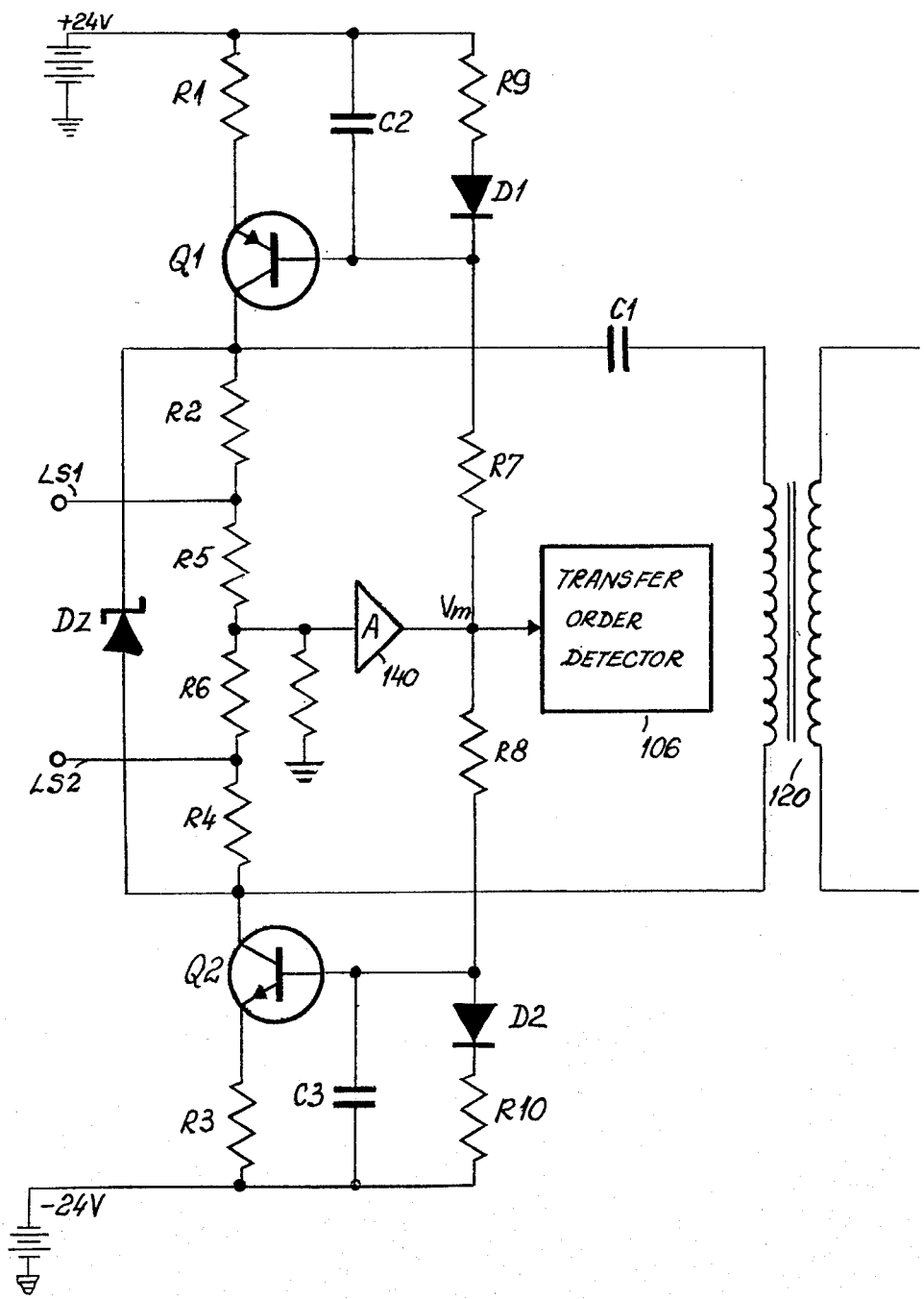
FIG. 4 is a circuit diagram illustrating a modification of the line circuit of FIG. 3.

FIG. 4 illustrates a modified line circuit in which the sensitivity to discriminate between a transfer order unbalance and a spurious unbalance is increased by improving the feedback loop.

The modified circuit ilustrated in FIG. 4 is basically the same as that of FIG. 3 (and therefore includes correspondingly numbered elements) except that an amplifier 140 is provided in the feedback loop between the junction of resistors R5, R6 and the middle junction Vm of the feedback loop. Amplifier 140 regulates the current through the transistors toward equalization. Shorting one of the line wires to earth changes the control voltage and therefore the output of the amplifier. This voltage can be brought near to zero on normal operation so that voltage deviations effected by the transfer order can be reliably discriminated.

The transfer order detector 106 (FIGS. 2 and 4) is connected to the middle junction Vm of the feedback loop. A suitable detector is described below with reference to the standard subscriber unit illustrated in FIG. 5.

A suitable signalling detector (104, FIG. 2) which detects off-hook and dialling conditions, is also described below with respect to the standard subscriber unit illustrated in FIG. 5.

The two transistors Q1, Q2 of the constant direct current sources illustrated in FIG. 4 are protected by a Zener diode Dz which is connected between the collectors of the two transistors. A reverse voltage will be shorted by the Zener diode, whereas a voltage with the same polarity as the voltage sources will be limited by the Zener voltage.

Figure 5:
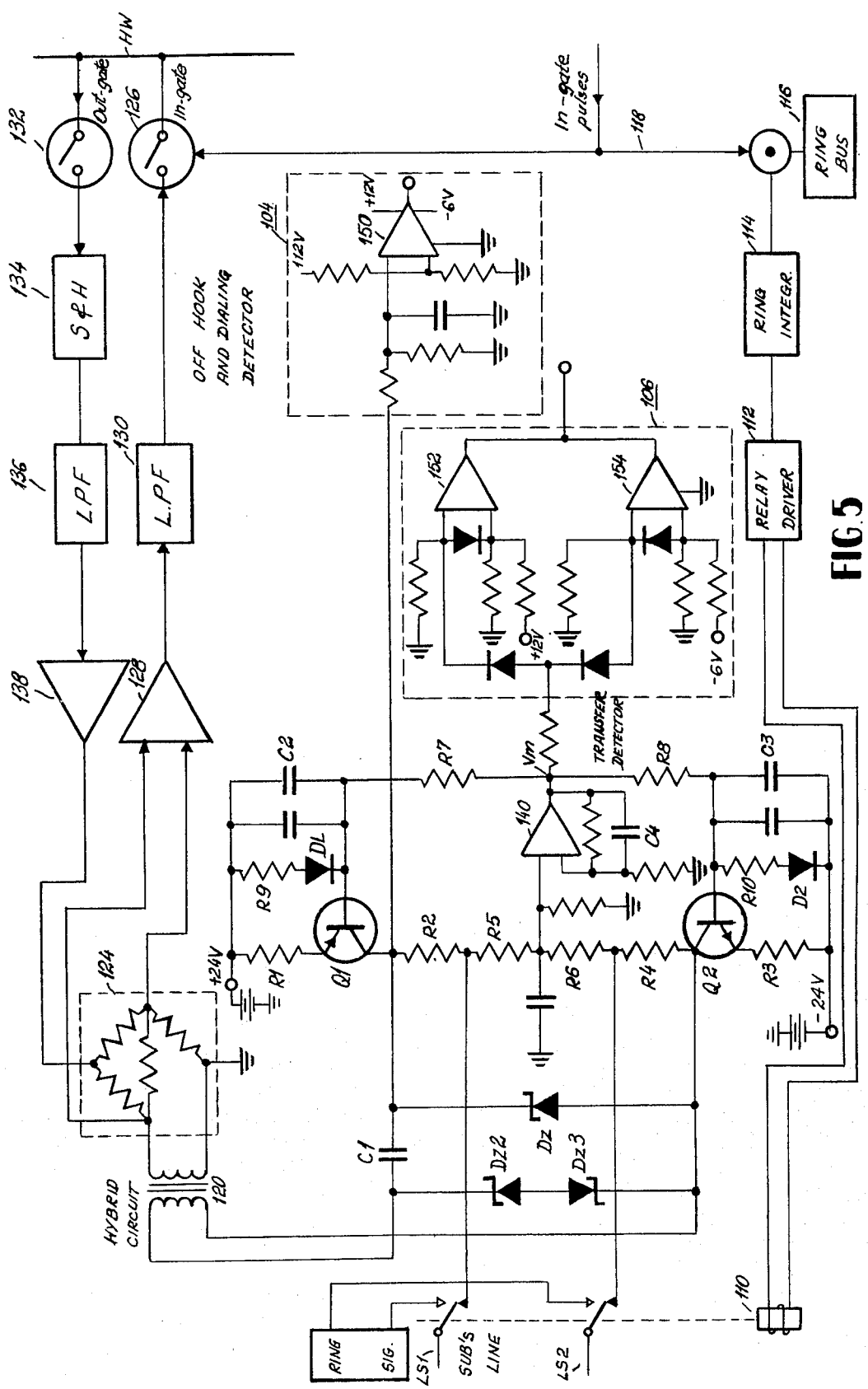
FIG. 5 illustrates a specific subscriber unit corresponding to FIGS. 2–4, but including further modifications, this subscriber unit being specifically for use in the time-division-multiplex system of FIG. 1.

FIG. 5 illustrates a standard subscriber unit particularly for use in the time-division-multiplex system of the above-identified copending application.

The subscriber unit of FIG. 5 includes the circuit illustrated in FIG. 4, for providing constant direct current to the subscriber's line, i.e. it includes transistors Q1, Q2 and the feedback loop containing amplifier 140 for improving the sensitivity of the system to discriminate an unbalance caused by a transfer order. The system of FIG. 5, however, includes an additional capacitor C4 connected to control amplifier 140 in order to slow down the time response of the feedback loop. This slowing down of the feedback loop time response reduces the possibility of error arising as a result of transient effects when dialling.

The signalling detector (104 in FIG. 2) detects the off-hook and dialing conditions. These line conditions are detected by using an integrator 150 whose time constant is particularly large, to distinguish between noise and bouncing effects and the above line conditions. Since the signalling detector 104 also has to pass the dialling signals, capacitor C1, connected between subscriber's line and the line transformer, must be limited so that the dialling voltage will not be unduly distorted. These distortions will particularly influence outgoing dialling. The limited value of the capacitor C1 will influence the frequency response of the subscriber link. As one example, capacitor C1 could be 3.3 microferads.

The transfer order detector 105 includes two comparators 152, 154 in the subscriber's unit illustrated in FIG. 5. These comparators sense the sign of some definite voltage level in order to discriminate a voltage unbalance in the feedback loop of the constant direct current sources.

The hybrid circuit 124 uses an asymmetrical resistor bridge so that there is a small loss of the signal in going from the common transmission highway HW to the subscriber's line than in going in the reverse direction. This is effected by enlarging the loss from the subscriber's line to the common transmission highway. This manner of reducing the comparative loss in the information transmitted by the highway HW to the subscriber's line enables the maintenance of the required undistorted voltage swing supplied to the line.

Reducing such a loss with a hybrid transformer requires asymmetry between the incoming and outgoing windings of the transformer.

Two 2-wire subscribers are tied by a connecting a loop of two hybrid circuits. Each subscriber circuit is a "half-loop." Unbalance of the hybrid bridge causes leakage from the "transmitter" to the "receiver." Each hybrid circuit contains an amplifier (128, 138) to compensate for no more than the losses from the transmitter to the line, and from the line to the receiver. The loop is thus make free of oscillation for all values of line impedances.

The low-pass-filters 130, 136 are preferably RC-active operational amplifiers. Each filter has about a 50 dB/octave slope outside the needed range, and a special dip in the sampling frequency.

The sample-and-hold circuit 134 is provided for improving the signal-to-noise ratio and for facilitating the reconstruction of the sampled information. This circuit is included only in the outgoing part of the link, for transmitting the information from the common transmitting highway HW to the subscriber's set via the Out-gate 132.

Each subscriber is called by the activation of its electromechanical bell on a "ring" order. The high voltage ringing beats are supplied by the ringer (108) of the exchange. The ringing signal is of a frequency of 16.7 Hz, and provides one sec. duration beats every 4 seconds. The beat voltage is formed from the 220 V, 50 Hz line supply, by using a suitable frequency-divider circuit, increasing the period of each alternation by three over that of the line.

The high voltage ringing beats are supplied to the line through the contacts on relay 110. As described with reference to FIG. 2, this relay is operated by relay driver 112 and ring integrator circuit 114 by the In-gate pulses supplied on line 118 to enable the ring bus 116. The arrangement is such that ring bus 116 is enabled to effect the ring signal in the time-slot of the subscriber to whom ringing voltages are sent. The system tests off-hook conditions between the ring beats when the current sources are connected to the line.

While the invention has been described with respect to a time-division-multiplex system, it will be appreciated that it, or features thereof, could be used in other systems, for example, space-division (SDS) systems. Another possible application is in transmission bridges, including switching networks constructed with metallic switches.

Many other variation, modifications and applications of the illustrated embodiment will be apparent.

What is claimed is:

1. A line circuit for connecting a subscriber terminal to a signal transmission network including a direct current supply for driving the subscriber terminal and a line transformer connecting the subscriber terminal to the signal transmission network with the line between the line circuit and the subscriber terminal having two wires; characterized in that the direct current supply is a constant direct current supply, including a pair of symmetrical constant direct current sources, each coupled to one of said two wires and a feedback loop; and a capacitor in the line circuit for blocking the passage of the constant direct current through the line transformer.

2. A line circuit according to claim 1, wherein the constant direct current supply has a large output impedance and supplies a constant current of about 30 ma when the line resistance is less than 1400 ohms.

3. A circuit according to claim 1, wherein said constant direct current supply further comprises first and second DC voltage sources for supplying driving voltage for said current sources; and wherein said pair of constant current sources comprises a pnp and an npn transistor connected together in series with respective ones of said first and said second DC voltage sources, and said feedback loop includes a first pair of resistors connected between and in series with the two transistors, and a second pair of resistors each being connected between the juncture of the two resistors of the first resistor pair and the base of one of the transistors.

4. A circuit according to claim 3, wherein each constant current source further includes a resistor coupled between the emitter of the transistor and the respective one of said first and second DC voltage sources and a diode and resistor connected in series from the base of the transistor to the respective DC voltage source, said diodes being biased so that the voltage thereacross follows the base emitter voltage to operatively maintain a substantially constant voltage across the emitter resistor and a substantially constant emitter current.

5. A circuit according to claim 4, further including a Zener diode connected between the collectors of the two transistors.

6. A circuit according to claim 5, further including an amplifier in the feedback loop for regulating the current through the transistors toward equalization.

7. A subscriber unit including a line circuit according to claim 6 and including a subscriber link for coupling the line transformer to the transmission network wherein said link includes a hybrid circuit comprising an assymmetrical resistor bridge for producing a smaller loss in the signal transmitted to the transmission network than in the signal received from the transmission network.

* * * * *